(12) United States Patent
Pell et al.

(10) Patent No.: US 9,514,094 B2
(45) Date of Patent: Dec. 6, 2016

(54) PROCESSING DATA SETS USING DEDICATED LOGIC UNITS TO PREVENT DATA COLLISION IN A PIPELINED STREAM PROCESSOR

(75) Inventors: Oliver Pell, London (GB); Itay Greenspon, London (GB); James Barry Spooner, London (GB); Robert Gwilym Dimond, London (GB); Jacob Bower, London (GB); Richard Berry, London (GB)

(73) Assignee: MAXELER TECHNOLOGIES LTD, London (GB)

(*) Notice: Subject to any disclaimer, the term of this patent is extended or adjusted under 35 U.S.C. 154(b) by 843 days.

(21) Appl. No.: 13/545,326

(22) Filed: Jul. 10, 2012

(65) Prior Publication Data

US 2014/0019729 A1    Jan. 16, 2014

(51) Int. Cl.
*G06F 9/44* (2006.01)
*G06F 9/38* (2006.01)
*G06F 15/80* (2006.01)

(52) U.S. Cl.
CPC ......... G06F 15/8053 (2013.01); G06F 9/3869 (2013.01); G06F 9/4436 (2013.01)

(58) Field of Classification Search
CPC .............................. G06F 9/4436; G06F 9/3869
USPC .................................................... 712/28, 201
See application file for complete search history.

(56) References Cited

U.S. PATENT DOCUMENTS

| 4,159,519 | A | * | 6/1979 | Gupta | 712/247 |
| 5,592,679 | A | * | 1/1997 | Yung | 712/23 |
| 6,421,815 | B1 | | 7/2002 | Seawright | |
| 2002/0010793 | A1 | * | 1/2002 | Noll et al. | 709/240 |
| 2003/0156652 | A1 | * | 8/2003 | Wise et al. | 375/240.26 |
| 2003/0200421 | A1 | * | 10/2003 | Crook et al. | 712/215 |
| 2004/0098452 | A1 | * | 5/2004 | Brown et al. | 709/203 |
| 2004/0174810 | A1 | * | 9/2004 | Soni et al. | 370/206 |
| 2007/0008984 | A1 | * | 1/2007 | Philips et al. | 370/412 |
| 2011/0200147 | A1 | * | 8/2011 | Letunovskiy et al. | 375/316 |
| 2011/0273459 | A1 | * | 11/2011 | Letellier et al. | 345/505 |

FOREIGN PATENT DOCUMENTS

EP    2393016 A2    12/2011

OTHER PUBLICATIONS

Andrew S Tanenbaum, Structured Computer Organization, 1984, Second edition, 5 pages.*
Hennessy and Patterson, Computer Architecture A Quantitative Approach, 1996, Morgan Kaufmann, Second edition, 7 pages.*
Cristea, et al., "FPL-3: Towards Language Support for Distributed Packet Processing," Networking (2005) p. 743-755 (12 p.).
Duncan, et al., "packetC Language for High Performance Packet Processing," 2009 11th IEEE International Conference on High Performance Computing and Communications, IEEE Computer Society Washington, DC, USA (2009) p. 450-457 (8 p.).

* cited by examiner

*Primary Examiner* — Andrew Caldwell
*Assistant Examiner* — Jyoti Mehta
(74) *Attorney, Agent, or Firm* — Conley Rose, P.C.

(57) ABSTRACT

There is provided a method for processing multiple sets of data concurrently in a statically scheduled pipelined stream processor by allowing a data set to enter the pipeline while another data set is being processed. Dedicated logic units enable independent control of each of the data sets being processed.

17 Claims, 5 Drawing Sheets

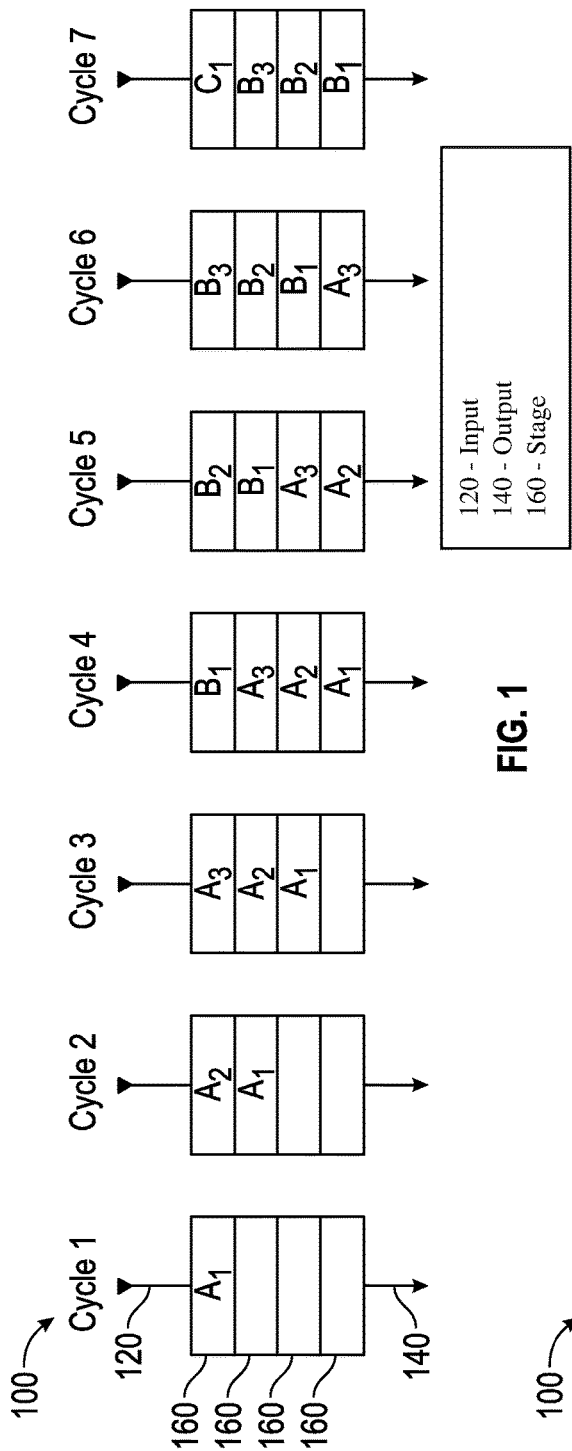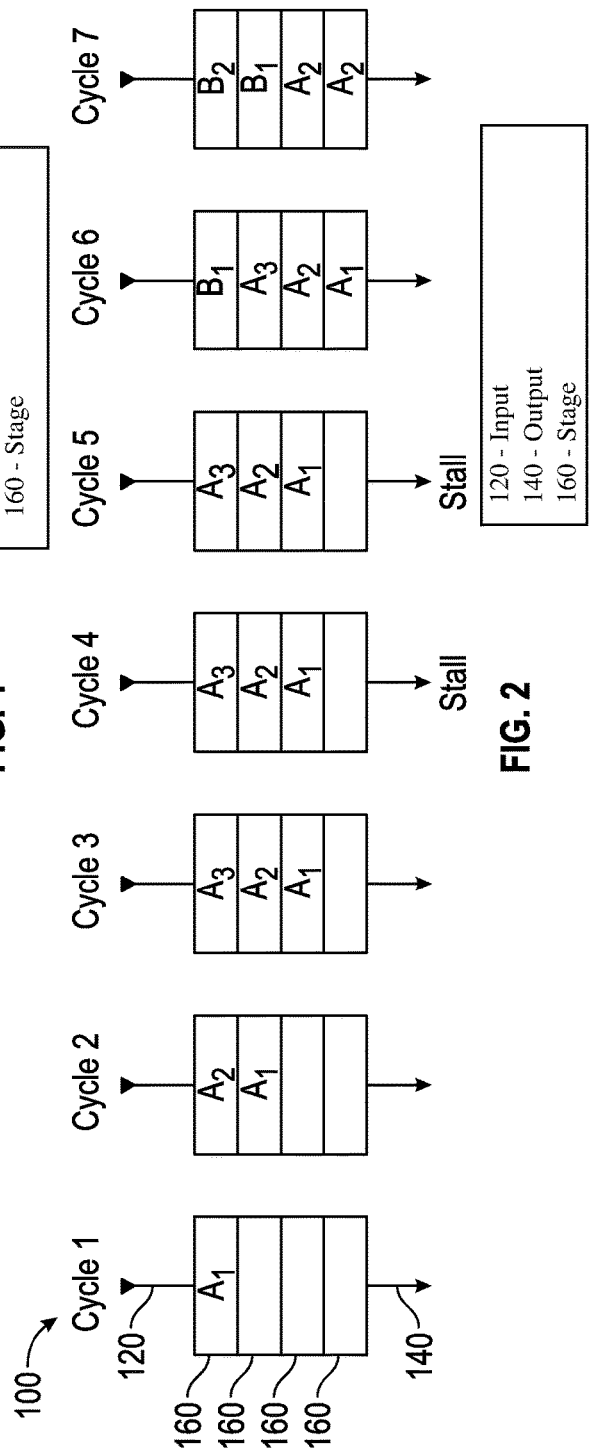

PROCESSING DATA SETS USING DEDICATED LOGIC UNITS TO PREVENT DATA COLLISION IN A PIPELINED STREAM PROCESSOR

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

1. Field of the Invention

The invention relates generally to a methods and systems for processing data sets, a pipelined stream processor for processing data sets, and a computer program for programming a pipelined stream processor. More particularly, the invention relates to a method of processing multiple sets of data in a single pipeline of a pipelined stream processing architecture, a pipelined stream processor having logic units for processing data sets, and a computer program for programming such a pipelined stream processor.

2. Background of the Technology

In areas ranging from the financial industry to industrial and academic research, computational modelling/analysis/simulations are routinely carried using a variety of computer systems. For non-intensive applications, commercially available personal computers (PCs) with standard central processing units (CPUs) are generally adequate. Typically, such PCs deal with a small number of data sets each having relatively few data points. However, for many computationally intense applications such as iterative calculations involving millions to billions of data points, standard CPUs often cannot cope with the large quantities of data that require processing or the complexity of the mathematical models used. This inability to cope with the computational strains renders the time taken to complete a calculation prohibitively long. For these intensive applications, specialist hardware accelerators have been developed to reduce computation time and to cope with ever more complex operations. In the development of hardware accelerators, static dataflow architectures which can be implemented on Field-Programmable Gate Arrays (FPGAs) have, over time, emerged as a particularly suitable type of hardware for handling complex numerical applications.

A hardware accelerator such as an FPGA implementing static dataflow architectures typically consists of a hardware data path implementing a series of computational steps/functions in a pipeline. The pipeline may have many stages where each stage consists of some number of logic operations. The pipeline may also have a storage element (register) and a number of input and output stages. Data moves through the pipeline and is computed upon at each intermediate stage. The latency of such a pipeline can be defined as the total time taken to complete a set of calculations, typically measured in clock cycles.

FPGAs, such as that described in EP-A-23930160, are semiconductor integrated circuit (IC) devices that are programmable and reconfigurable to suit a given application. Typically, an FPGA includes several input and output pins, and an array of logic elements interconnected via reconfigurable interconnects. A dataflow accelerator can be built by configuring the logic elements and interconnects into pipelines as described above.

A computational process begins with a data set being read into the pipeline via the inputs. A data set may include one or more data items which are read into the pipeline one per clock cycle. The data items are then streamed through the pipeline, stage by stage, and are eventually read out of the pipeline via the outputs. The computational process is conventionally divided into three phases. First, the FILL phase, where data items are read into the pipeline but no output is written. Second, the RUN phase, where for a fully loaded pipeline, new data items continue to be read in whilst data items are written out in a one-in-one-out manner. Last, the FLUSH phase, where data is written to the output with no new data read in. The activity of the pipeline is controlled by a logic element often referred to as a state machine, which enables or disables the pipeline depending on the availability of data at the inputs, availability of buffer space to write outputs to, and desired activity state of the computation. FIG. 1 shows a simplified example of such a conventional pipeline.

In FIG. 1, the operation of a conventional pipeline 100 over seven consecutive clock cycles is shown. The pipeline 100 of FIG. 1 includes an input 120, an output 140, and four discrete stages 160. A pipeline such as the pipeline 100 is often referred to as a statically scheduled pipeline, so called from the fact that its functionality is pre-programmed with fixed latency both for the pipeline as a whole and for each function within the pipeline. It will be appreciated that the pipeline 100 may have any suitable number of discrete stages 160. In the scenario shown in FIG. 1, a continuous stream of data, divided into three data sets, A, B, and C, arrives at the input 120 and awaits entry into the pipeline 100.

In cycle 1, operating under the FILL phase, the first data item $A_1$ is read in and proceeds to occupy the first discrete stage 160 of the pipeline 100, where the operation associated with the first discrete stage is performed.

In cycle 2, the second data item $A_2$ is read in, which prompts the advancement of data item $A_1$ to the second discrete stage 160, allowing data item $A_2$ to enter the pipeline 100 to occupy the first discrete stage 160.

The process continues to cycle 3 in which the third data item $A_3$ is read into the pipeline 100. At this stage, although all three data items of data set A have entered the pipeline 100, no output can be written by virtue of the fact that the pipeline 100 is only partially filled.

In cycle 4, still operating under the FILL phase, the first data item, $B_1$, of data set B is read into the pipeline 100 so that all the discrete stages 160 are occupied.

The process then switches, in cycle 5, to the RUN phase in which data item $B_2$ is read into the pipeline 100 and the first data item, $A_1$, of data set A is written to the output 140.

By cycle 7, still operating under the RUN phase, the last item, $A_3$, of data set A is written to the output and the first data item, $C_1$, of data set C is read in. When no more data is to be read into the pipeline 100, the process switches to the FLUSH phase in which output is written with no new data being read in.

Conventionally, the operation and management of such a pipeline is simplified to the three phases described above so as to keep the design and manufacture of the processor from becoming prohibitively complex and expensive. In spite of this simplification, the stream architecture described above makes efficient use of the resources as once the pipeline 100 is loaded with data, every part of the pipeline 100 is performing an operation. This makes the pipeline 100 particularly well suited for processing large data sets or a continuous stream of data sets where the total number of data items (typically millions to billions) is much greater than the length of the pipeline 100 (typically hundreds to thousands). However, problems arise when handling a large number of small data sets where either the number of items in any given data set or the gaps between data sets are of comparable size to the length of the pipeline.

FIG. 2 shows the same conventional pipeline 100 over seven consecutive clock cycles. In the scenario of FIG. 2, data sets A and B, both having three items, arrive at the input 120 and await entry into the pipeline 100. As shown, the two data sets are separated by a gap of length of two clock cycles. The process begins, as described above, with the FILL phase and the three items of data set A are read into the pipeline 100 over three clock cycles such that by cycle 3, the first three stages 160 of the pipeline 100 are respectively occupied by items $A_1$, $A_2$, and $A_3$. At this point, due to the gap between data set A and data set B, no new data is available to be read in. As the pipeline 100 is not filled, the RUN phase cannot begin, causing the pipeline 100 to stall where data is neither read in nor written out.

As shown in FIG. 2, the pipeline 100 will remain stalled for two cycles to cycle 6, at which time data set B arrives at the input 120 and is read into the pipeline 100. Such stalling will evidently increase the latency to the output of data set A to the detriment of its efficiency. It will be appreciated that the effect of stalling will be magnified when the gaps between data sets are large.

To partially alleviate the effect of stalling of the above described statically scheduled pipeline 100, the operation can be configured to omit the RUN phase such that the pipeline 100 switches from the FILL phase directly to the FLUSH phase each time a complete data set is read into the pipeline 100. For example, referring to FIG. 2, the pipeline 100 can be configured to switch to the FLUSH phase in cycle 4 so as to eliminate the delay in writing data set A to the output 140.

In the case where two data sets are separated by a gap that is much greater than the length of the pipeline 100, flushing the pipeline 100 immediately after the first data set is read in enables data in the pipeline 100 to be streamed through for writing to the output 140 without delay, and the pipeline will have completed flushing and be ready to process the second data set before it arrives. However, if the gap between data sets is small relative to the length of the pipeline, forcing the pipeline to flush has the undesirable effect of lengthening the gaps between data sets. In the absence of stalling, the latency of processing N sets of data of the same length would be:

$$\text{pipeline\_length} + N \times \text{data\_set\_length} \quad (1)$$

If each data set must be flushed, the latency then becomes:

$$N \times (\text{pipeline\_length} + \text{data\_set\_length}). \quad (2)$$

This effectively forces each gap between data sets to at least the length of the pipeline 100.

In addition to the above described shortcomings associated with processing a large number of small data sets, for a processor implementing the above pipeline 100, extra resources must be allocated as buffer to temporarily store data that is pending entry into the pipeline 100. Insufficient allocation of buffer will cause a "back up" of the pipeline 100, ultimately leading to the halting of the operation of other components of the processor.

Various computer programming languages have been proposed in, for example, the article entitled "packetC Language for High Performance Packet Processing", Duncan et al., HPCC'09, IEEE, and "FPL-3: towards language support for distributed packet processing", Cristea et al., NETWORKING 2005, Springer, for building packet processing systems. These tend to target software implementations, where the challenges are fundamentally different.

Languages that compile into hardware, for example the Synopsis Protocol Compiler described in U.S. Pat. No. 6,421,815, synthesize a Finite State Machine (FSM) based on a behavioural description. This is a different problem to the embodiments described herein, which address an implementation that is described by the programmer as a pipelined data path plus state machine and improve the way in which that data path is managed.

As an alternative to that described above, components in a pipeline can be dynamically scheduled, rather than statically scheduled. In the simplest case, this could consist of a graph of nodes where data is passed from top to bottom and is accompanied by a 'valid' token that indicates that calculations should be performed at each stage.

Dynamically managed pipelines can avoid the flushing problem, because each stage of the pipeline operates when it has data to process, independently of the state of the other stages of the pipeline. However, each hardware component in the pipeline must manage this dynamic behaviour, thus incurring a hardware cost. Statically scheduled pipelines are simpler, consume less silicon resource and are easier to design and debug. However they encounter the problems described above.

Accordingly, there remains a need in the art for an improved pipelined stream processing architecture for processing a large number of data sets in statically scheduled pipelines, in particular where the size of each data set is small relative to the length of the pipeline.

BRIEF SUMMARY OF THE DISCLOSURE

According to one embodiment described herein, there is provided a method of processing data sets in a pipelined stream processor; the processor having a pipelined data path; the pipeline including at least one input, at least one output, and at least one discrete stage; the pipeline configured to enable one or more data sets each comprising one or more data items to be streamed therethrough; wherein, in use, said data items enter said pipeline from the at least one input, propagate through said pipeline, and exit said pipeline through the at least one, the or each discrete stage representing an operation to be performed on the data item occupying said discrete stage; the method comprising: defining one or more non-overlapping sections of said pipeline corresponding to portions of said pipeline occupied by the data items of one of the at least one data set; providing one or more logic units each dedicated to control the progress of the data items of one of the at least one data set through said pipeline as said section advances through said pipeline.

By providing such a method, multiple sets of data may be processed concurrently in a statically scheduled pipelined stream processor by allowing a data set to enter the pipeline whilst another data set is being processed. The drawbacks of stalling for the arrival of the next data set can be mitigated, whilst ensuring that the data sets within a shared pipeline do not collide. The dedicated logic units are able to control, independently, each of the data sets being processed within the pipeline, such that the efficiency and flow of data can be maintained irrespective of the relative size of the data sets to the pipeline or the frequency of data sets, thus enabling a single pipeline to process multiple packets, or data sets, concurrently.

Although described herein as logic units, in effect, the logic units may be considered as state machines, which independently monitor and control the state of a particular packet or data set as it progresses through the pipeline.

In an embodiment, the method further comprises providing a logic controller, the logic controller configured to monitor the one or more logic units. Preferably, each of the one or more logic units is configured to communicate with the logic controller and the logic controller is configured to control the one or more logic units so as to not allow the one or more sections to overlap. Thus the method advantageously avoids errors whilst maintaining efficient data flow.

In another embodiment, the method further comprises maintaining a predetermined gap of one or more discrete stages of said pipeline between two consecutive data sets, thus enabling data spacing to be simply and reliably effected.

Preferably, the method further comprises assigning an unused logic unit to monitor and to control the progress of a data set newly entering said pipeline.

In yet another embodiment, the method further comprises stalling the progress of one of the one or more data sets along said pipeline for a number of clock cycles.

By having dedicated logic units, one data set can be stalled without any effect on any other data sets. In other words, the flow of data sets can be said to be effectively decoupled, at least for part of their flow through the pipeline.

In a further embodiment, each of the one or more data sets includes a first item and a last item, the position of the first item along said pipeline defines a fill level and the position of the last item defines a flush level; the method further comprises monitoring by the one or more logic units the fill level and the flush level of the one or more data sets; and communicating by said one or more logic units said fill level and said flush level of the one or more data sets to the logic controller.

Preferably, the method further comprises comparing, by the logic controller, the flush level of one of the said one or more data sets with the fill level of a subsequent data set, and controlling, by the logic controller, the one or more logic units so as to ensure that the flush level of said one data set is great than the fill level of said subsequent data set.

In a yet further embodiment, the number of discrete stages of said pipeline is greater than the average number of data items within said one or more data sets.

Thus the method described provides a simple and reliable way of avoiding overlapping or collision.

According to another embodiment, there is provided a pipelined stream processor for processing data sets, the processor comprising: a plurality of hardware elements corresponding to a pipeline having at least one input element, at least one output element, and at least one discrete stage element; the pipeline configured to enable one or more data sets each comprising one or more data items to be streamed therethrough; the at least one input element each arranged to enable said data items to be received, the at least one discrete stage element each arranged to enable said data items to propagate through said pipeline, the at least one output element each arranged to enable said data items to exit said pipeline; the at least one discrete stage element each able to perform an operation on the data item occupying said discrete stage element; wherein the processor is arranged to enable one or more non-overlapping sections of said pipeline to be defined, said one or more non-overlapping sections each correspond to a portion of said pipeline occupied by the data items of one of the at least one data set; wherein the processor further comprises a plurality of hardware elements corresponding to one or more logic unit elements each able to output commands to said pipeline to control the progress of the data items of one of the at least one data set through said pipeline as said section advances through the pipeline.

In an embodiment, the processor further comprises a hardware element corresponding to a logic controller element arranged to monitor the one or more logic unit elements. Preferably, the one or more logic unit elements are each further arranged to output information to the logic controller element and the logic controller element is arranged to control the behaviour and output commands of the one or more logic unit elements so as to not allow the one or more sections to overlap.

In another embodiment, the logic controller is further arranged to coordinate the one or more logic unit elements to output commands to maintain a gap of one or more discrete stage elements of said pipeline between two consecutive data sets.

Preferably the processor is further arranged to enable an unused logic unit element to be assigned to monitor and to control the progress of a data set newly entering said pipeline.

In yet another embodiment, the one or more logic unit elements are further arranged to output commands to stall the progress of one or more data sets along said pipeline for a predetermined number of clock cycles.

In a further embodiment, each of the one or more data sets includes a first item and a last item, the position of the first item along said pipeline defines a fill level and the position of the last item defines a flush level. Preferably, each of the one or more logic unit elements is further arranged to monitor the fill level and the flush level of one of the one or more data sets, and to output information pertaining to said fill level and said flush level to the logic controller element.

Preferably, the logic controller element is further arranged to compare the flush level of one of the said one or more data sets with the fill level of a subsequent data set, and to control the one or more logic units so as to ensure that the flush level of said one data set is greater than the fill level of said subsequent data set.

In a yet further embodiment, the number of discrete stage elements of said pipeline is greater than the average number of data items within said one or more data sets.

According to a further embodiment, there is provided a computer program product for programming a pipelined stream processor executable by a programmable processing apparatus, the program product comprising one or more software portions for performing the method of any of the above described embodiments.

According to another embodiment, a non-transitory computer-readable storage medium comprises instructions that when executed cause one or more processors to, upon receipt of one or more data items of one or more data sets through at least one input, propagate the data items through a pipelined data path having at least one discrete stage, and output the data items through at least one output. In addition, the non-transitory computer-readable storage medium comprises instructions that when executed cause the one or more processors to define one or more non-overlapping sections of the pipelined data path corresponding to portions of the pipelined data path occupied by the data items of at least one data set. Further, the non-transitory computer-readable storage medium comprises instructions that when executed cause the one or more processors to control the progress of the data items of the at least one data set through the pipelined data path as the corresponding section advances through the pipelined data path.

Embodiments described herein comprise a combination of features and advantages intended to address various shortcomings associated with certain prior devices, systems, and methods. The foregoing has outlined rather broadly the features and technical advantages of the invention in order that the detailed description of the invention that follows may be better understood. The various characteristics described above, as well as other features, will be readily apparent to those skilled in the art upon reading the following detailed description, and by referring to the accompanying drawings. It should be appreciated by those skilled in the art that the conception and the specific embodiments disclosed may be readily utilized as a basis for modifying or designing other structures for carrying out the same purposes of the invention. It should also be realized by those skilled in the art that such equivalent constructions do not depart from the spirit and scope of the invention as set forth in the appended claims.

BRIEF DESCRIPTION OF THE DRAWINGS

For a detailed description of the preferred embodiments of the invention, reference will now be made to the accompanying drawings in which:

FIG. 1 is a schematic illustration of a statically schedule pipeline performing a computation on a continuous data stream;

FIG. 2 is a schematic illustration of a statically schedule pipeline performing a computation on a discontinuous data stream;

DETAILED DESCRIPTION OF THE PREFERRED EMBODIMENTS

Figure 3:
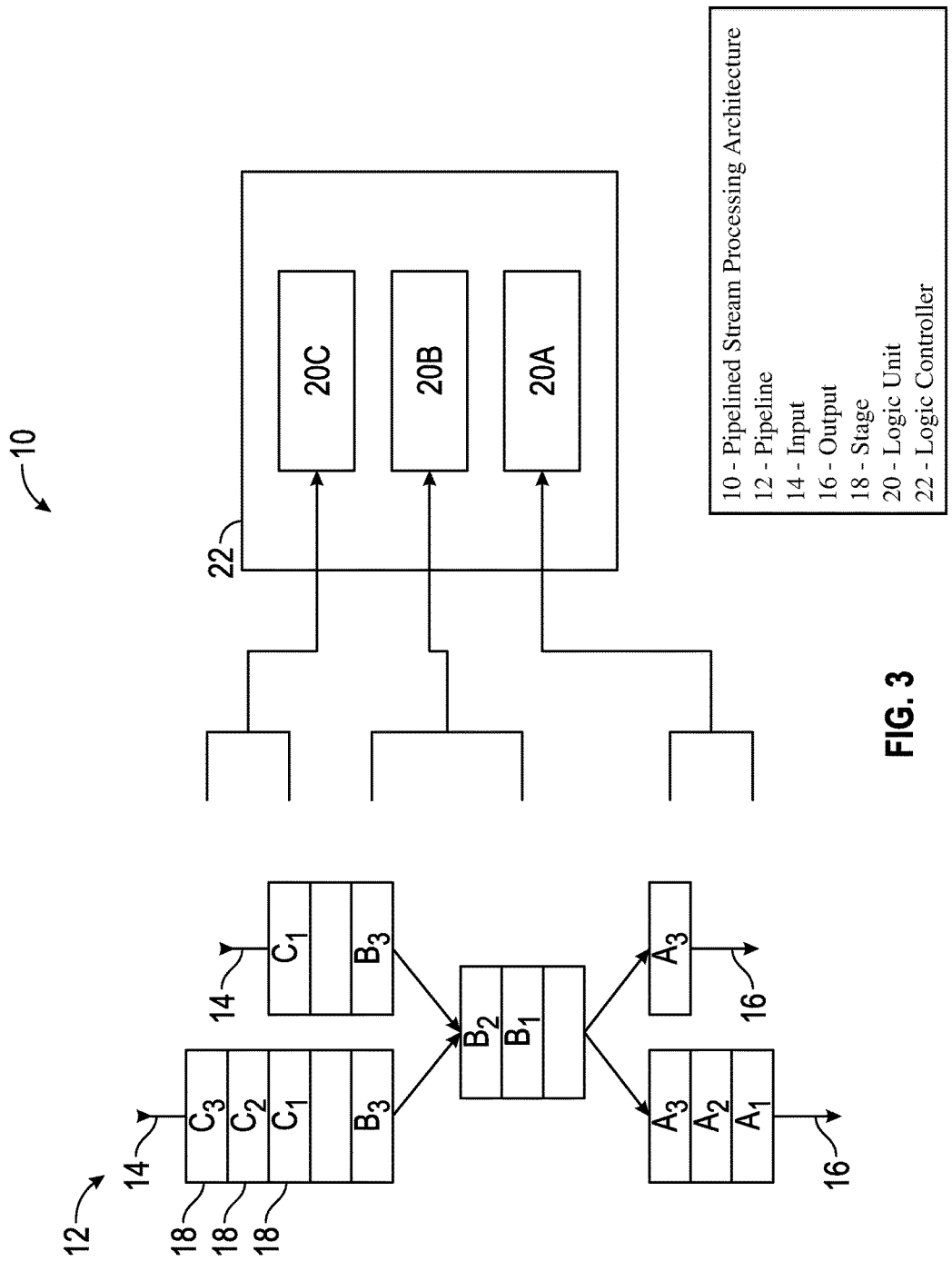
FIG. 3 is a schematic illustration of a pipelined stream architecture.

The following discussion is directed to various exemplary embodiments. However, one skilled in the art will understand that the examples disclosed herein have broad application, and that the discussion of any embodiment is meant only to be exemplary of that embodiment, and not intended to suggest that the scope of the disclosure, including the claims, is limited to that embodiment.

Certain terms are used throughout the following description and claims to refer to particular features or components. As one skilled in the art will appreciate, different persons may refer to the same feature or component by different names. This document does not intend to distinguish between components or features that differ in name but not function. The drawing figures are not necessarily to scale. Certain features and components herein may be shown exaggerated in scale or in somewhat schematic form and some details of conventional elements may not be shown in interest of clarity and conciseness. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct electrical connection. Thus, if a first device couples to a second device, that connection may be through a direct electrical connection, or through an indirect electrical connection via other devices and connections.

FIG. 3 shows a schematic illustration of an embodiment of a pipelined stream processing architecture 10 for processing a large number of small data sets in accordance with the principles described herein. The stream architecture 10 may, for example, be implemented by a stream processor such as an FPGA-based processor. In the example of FIG. 3, the stream architecture 10 includes a pipeline 12 having an input 14 arranged to receive and read data into the pipeline 12, an output 16 arranged to write data out of the pipeline 12, and one or more discrete stages 18 each representing an operation to be performed on a data item occupying that particular discrete stage 18. The input 14, output 16, and discrete stages 18 all correspond directly to hardware elements to be implemented in hardware as part of a stream processor such as an FPGA-based processor. The pipeline 12 defines a computational data path, which represents the flow of data through the operations of an algorithm. The computational data path is commonly referred to as a kernel. The pipeline 12 is therefore configured to enable data, which may enter the pipeline 12 at the input 14 in the form of a data stream, to be streamed through from discrete stage 18 to discrete stage 18 and written out of the pipeline 12 at the output 16.

In one example, the pipeline has more than one input/output, and may be branched. Indeed in the example shown, the input 14 is a parallel branched input such that data from the data set is introduced to both parallel input branches of the pipeline at the input 14.

The stream architecture 10 of FIG. 3 also includes one or more logic units (LUs) 20. Each LU 20 is communicatively coupled to the pipeline 12 and corresponds directly to a hardware element to be implemented in hardware as part of a stream processor such as an FPGA-based processor. Each LU 20 is arranged to monitor the progress of the data items of an individual data set and track certain parameters associated therewith as the data set is streamed through the pipeline 12. Accordingly, each LU 20 may be considered as a state machine for the particular data set as will be explained below. Importantly, providing plural LUs 20, each dedicated to monitor and control the progression of the data items of an individual data set, ensures that multiple data sets can simultaneously and independently propagate through the pipeline 12 without risk of collision or other harmful interaction. Each LU or state machine 20 is also arranged to take actions to control the progression of a data set when required. The stream architecture 10 further includes a logic controller 22 corresponding directly to a hardware element to be implemented in hardware as part of a stream processor such as an FPGA-based processor. The logic controller 22 is communicatively coupled to each of the one or more LUs 20 and is arranged to coordinate the actions of the LUs 20.

The stream architecture 10 performs a computation by first receiving data at the inputs 14 of the pipeline 12. Data arriving at the inputs 14 may be in the form of a data stream comprising one or more data sets, each having one or more data items. The data stream may be continuous, in which case one data item is followed immediately by another, or it may be discontinuous, in which case one data item is separated from the next by a gap. The data stream may also be continuous in parts and discontinuous in other parts. The data items of each data set are individually read in and enter the pipeline 12 from the input 14 at a rate of one item per clock cycle.

Having entered the pipeline 12, the data items are streamed through the pipeline 12 and the operations of each discrete stage 18 are carried out on each data items as they are streamed. Typically, a clock cycle refers to a predetermined length of time within which each operation, together with the advancement of the data item to the next discrete stage 18, is performed. The latency of the pipeline 12 is then defined as the total number of clock cycles required to perform a computation.

As mentioned above, to enable the pipeline 12 to process multiple sets of data concurrently without risk of collision or other negative interference, each data set entering the pipeline 12 is assigned to an individual LU 20. The LU 20 for a particular data set is then responsible for the progression of the data items of the assigned data set and may permit or prohibit the data items from advancing. In such an arrangement, the pipeline 12 is no longer required to stall for the arrival of a subsequent data set once the previous data set has finished entering the pipeline 12. Each LU 20 is able independently to control the progress of the data set assigned to it such that multiple sets of data may stream through the pipeline 12 concurrently.

In an embodiment, each LU 20 is configured independently to monitor the position of the data set to which it is assigned and is configured to track certain parameters associated with the data set, and does not require knowledge of being in a shared pipeline. The pipeline 12 may have any suitable number of LUs 20 depending on the intended application and each LU 20 is further configured to include a number of inputs and a number of outputs.

The inputs and outputs of each LU 20 may, for example, be parameters derived from the operation or condition of the pipeline, or commands directed to the pipeline 12. The inputs may also be commands received from the logic controller 22. Preferably, each LU 20 is configured to track the positions of the first and last data item of the data set to which it is assigned. These respectively define the fill level and the flush level of a data set, which combine effectively to delimit a section of the pipeline associated with the particular data set.

Each LU 20 is further configured to communicate, to the logic controller 22, information pertaining to the fill level and the flush level of the data set assigned to it. It will be appreciated that as a given data set advances through the pipeline 12, the position of the section associated therewith shifts accordingly. The logic controller 22 is configured to monitor the information communicated to it from each LU 20 and, based on a set of predetermined conditions, coordinates the commands output by the LUs 20 so as to ensure that the sections of the pipeline 12 do not overlap. Thus, collision of data sets can easily be avoided. In embodiments, the logic controller 22 is able to control the behaviour of each LU 20 based on a set of predetermined conditions and to control the output commands sent from each LU 20 to the pipeline 12.

For example, for a data set U, which may be part of a larger data stream, the data set U having five data items, $U_1$ to $U_5$, and streaming through a pipeline 12, the fill level defined by the position of data item $U_1$ may be represented by the parameter FILL_LEVEL$_U$ and the flush level defined by the position of data item $U_5$ may be represented by FLUSH_LEVEL$_U$. An available LU 20 is assigned to monitor the progress of data set U and begins tracking FILL_LEVEL$_U$ when data item $U_1$ is read into the pipeline 12. When data item $U_5$ enters the pipeline 12, the LU 20 assigned to monitor data set U continues tracking FILL_LEVEL$_U$ and begins tracking FLUSH_LEVEL$_U$. As data set U advances through the pipeline 12, the LU 20 communicates information pertaining to FILL_LEVEL$_U$ and FLUSH_LEVEL$_U$ to the logic controller 22 whilst keeping track of the two parameters. Once data set U reaches the end of the pipeline 12, the data items $U_1$ to $U_5$ exit the pipeline 12 via the output 16, at which point the LU 20 assigned to monitor data set U becomes available and may be assigned to monitor a data set newly entering the pipeline 12. It will be appreciated that subsequent data sets entering the pipeline are each assigned a dedicated LU 20, which monitors and tracks the assigned data set in a similar manner.

In addition to tracking the fill levels and flush levels of the data sets that are streaming through the pipeline 12, each LU 20 may be further configured to output commands to the pipeline 12 to either permit or prohibit the data items of the data set assigned to it from advancing through the pipeline 12. In embodiments, these outputs may be Boolean commands. For example, each LU may be configured to output an "ENABLE" command such that if the output of a particular LU 20 is ENABLE=true, the section assigned to that particular LU 20 is permitted to advance through the pipeline 12. That is to say, the data items of the assigned data set that are occupying the discrete stages 18 between the fill level and the flush level of the assigned data set are permitted to advance through the pipeline 12.

Each LU 20 may also be configured to receive a "STALL" command such that when the input of a particular LU 20 is STALL=true, the particular LU 20 is able to output an ENABLE=false command to the discrete stages 18 of the section assigned to that particular LU 20 to halt their respective operations, effectively prohibiting the data items occupying those discrete stages 18 from advancing through the pipeline 12. That is to say, the data items of the assigned data set that are occupying the discrete stages 18 between the fill level and the flush level of the assigned data set are prohibited from advancing through the pipeline 12. It will be appreciated that the "ENABLE" output and the "STALL" input of any single LU 20 cannot be simultaneously true.

It will be appreciated that for the Mth data item, $U_m$, of data set U, which position along the pipeline 12 is $Z(U_m)$, data item $U_m$ will only advance to the next discrete stage 18 if the output command from the LU 20 assigned to monitor data set U is ENABLE=true and provided that $$\text{FLUSH\_LEVEL}_U < Z(U_m) \leq \text{FILL\_LEVEL}_U. \quad (3)$$

It will also be appreciated that these criteria will, at any given time, be satisfied by either none or one LU 20. In some embodiments, one or more discrete stages 18 may disregard these criteria. For example, if the operation of a discrete stage 18 is purely functional, such as numerical addition, processing of invalid data does not cause error in subsequent operations; the discrete stage may then be configured to ignore the inequality.

In some embodiments, it may be desirable to force, maintain, or increase the gap between two data sets. For example, the resetting of a particular discrete stage 18 of the pipeline 12 may require more than one clock cycle and it may therefore be necessary to introduce an inter-set gap to allow the pipeline 12 the opportunity to reset before a subsequent data set is processed by that particular discrete stage 18. To achieve this, the logic controller 22 may be arranged and configured to coordinate the LUs 20 so as to impose an ENABLE=false command for one or more LUs 20 of the stream architecture 10 whilst maintaining an ENABLE=true command for the remaining LUs 20 of the stream architecture 10.

Thus, the pipeline 12 is able to process multiple sets of data concurrently and is not required to stall for the arrival of a subsequent data set after reading in one data set to flush in order to allow newly entered data set to exit the pipeline 12 before it is able to allow the next data set to enter. As compared to a conventional pipeline such as the pipeline 100 depicted in FIG. 1 and FIG. 2 which either requires flushing for each streaming data set or can enter the RUN phase only when the pipeline 100 is completely filled, the use of LUs 20 each dedicated to monitoring and tracking an individual data set allows the stream architecture 10 to enter the FLUSH phase for each data set individually.

Given that for some applications, the length of the pipeline 12 is much greater than the length of any given data set, and that the length of any given data set is much greater than any given gap between two data sets, enabling each data set to enter the FLUSH phase individually has the effect of reducing the latency of the pipeline 12. For example, a small data set or packet may be 16 bytes in size, and the inputs 16 of the pipeline 12 may be 8 bytes wide. The length of the data set would then be equivalent to 2 clock cycles. As a comparison, the length of the pipeline 12 may be dozens of clock cycles. The latency of a pipeline processing N evenly spaced data sets of the same length becomes:

$$\text{pipeline\_length} + N \times (\text{data\_set\_length} + \text{gap\_length}) + \text{no.\_of\_stalled\_cycles.} \quad (4)$$

Figure 4:
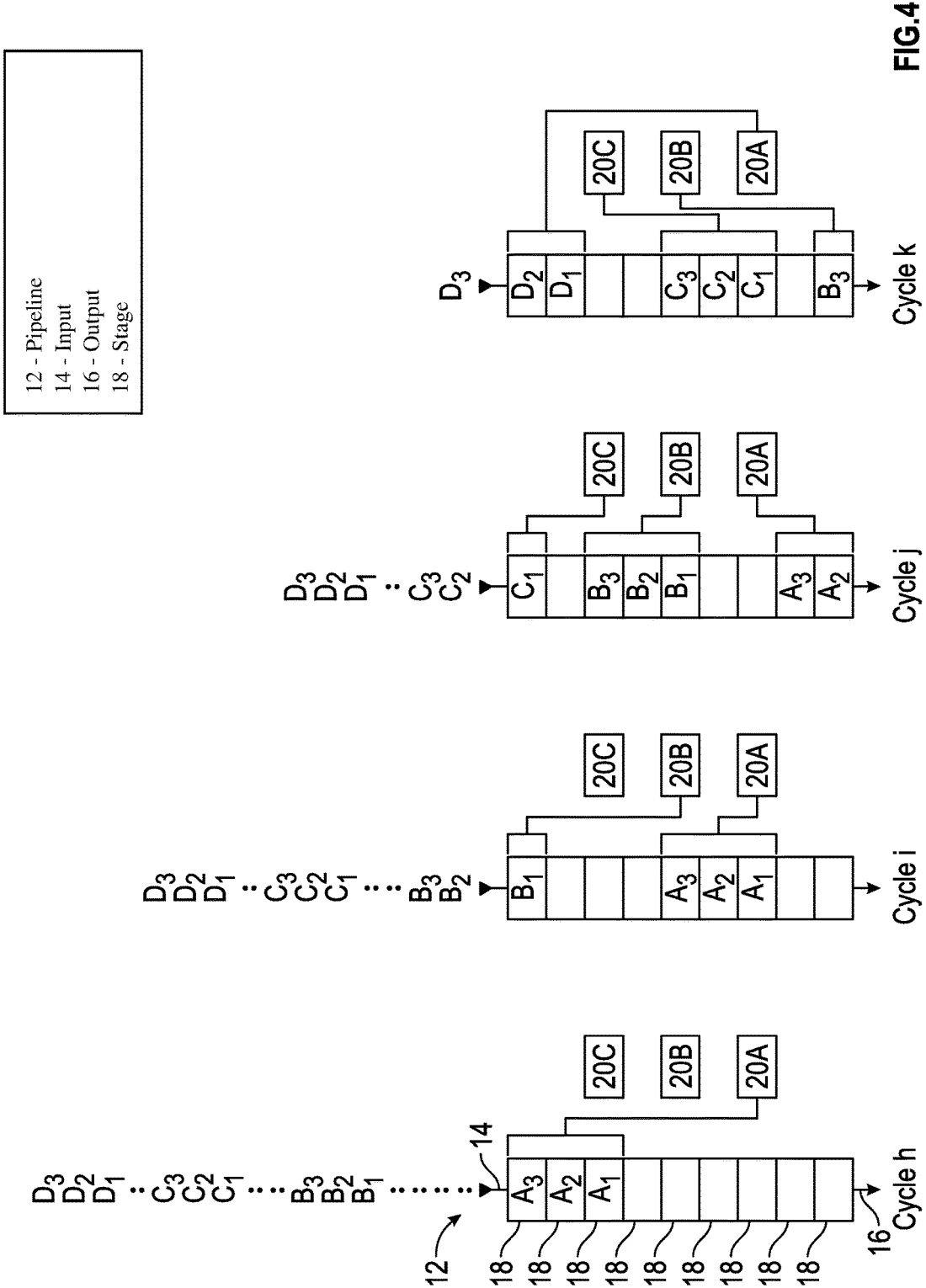
FIG. 4 is a schematic illustration of a pipelined stream architecture performing a computation.

FIG. 4 shows a schematic example of a portion of the stream architecture 10 in four separate clock cycles. The portion of the stream architecture 10 includes the pipeline 12 and three LUs, 20A, 20B, and 20C. The LUs 20A, 20B, and 20C are each arranged to be communicatively coupled to the pipeline 12 to receive inputs from and output commands to the pipeline 12. The LUs 20A, 20B, and 20C are also arranged to be communicatively coupled to a logic controller 22 (not shown in FIG. 4). The logic controller 22 is able to receive information from the LUs 20A, 20B, and 20C and to coordinate the output commands of the LUs 20A, 20B, and 20C. It will be appreciated that the pipeline 12 may be branched and includes more that one input 14 and more than one output 16. It will also be appreciated that the stream architecture 10 may include any suitable number of LUs.

In the example of FIG. 4, the pipeline 12 receives a discontinuous stream of four data sets, A, B, C, and D, each having three data items. As each data set is read into the pipeline 12, an available LU 20A, 20B, or 20C is assigned to monitor the position and progression of an individual data set. As shown in cycle h of FIG. 4, the pipeline 12 completes the reading of data set A such that data items $A_1$ to $A_3$ occupy the first three discrete stages 18 of the pipeline 12. The position of data item $A_1$ defines the fill level of data set A, $FILL\_LEVEL_A$, and the position of the data item $A_3$ defines the flush level of data set A, $FLUSH\_LEVEL_A$. These parameters are monitored by LU 20A, which has been assigned to monitor data set A, and increment accordingly as data set A advances through the pipeline 12. Information pertaining to these parameters are communicated by LU 20A as outputs to the logic controller 22.

Cycle i of FIG. 4 shows the pipeline 12 at a later point of the computation, in which data set A has advanced a number of discrete stages 18 along the pipeline 12 and the pipeline 12 has began the process of reading data set B such that data item $B_1$ now occupies the first discrete stage of the pipeline 12. The position of data item $B_1$ defines $FILL\_LEVEL_B$ and is monitored by LU 20B, which has been assigned to monitor data set B. As data set B advances through the pipeline 12, $FILL\_LEVEL_B$ increments accordingly, as in the case for data set A, and the information pertaining thereto is communicated by LU 20B as an output to the logic controller 22.

At a yet later point of the computation, shown in cycle j of FIG. 4, data set A has advanced further along the pipeline 12 and has began exiting the pipeline 12 via the output 16. The remaining data items of data set B are streaming through the pipeline 12 and $FLUSH\_LEVEL_B$, which is defined by data item $B_3$, is tracked by LU 20B. Also shown in cycle j, data item $C_1$ has entered the pipeline 12, the position of which defines $FILL\_LEVEL_C$ and LU 20C has been assigned to monitor data set C.

Shown in cycle k, all three data items of data set C are streaming through the pipeline 12 and both $FILL\_LEVEL_C$ and $FLUSH\_LEVEL_C$, respectively defined by data item $C_1$ and data item $C_3$, are tracked by LU 20C. Also shown in cycle k, two data items of data set B and all of data set A have exited the pipeline 12. As LU 20A is no longer required to track data set A, it is assigned to track data set D, which has partially entered the pipeline 12.

The LUs 20A, 20B, and 20C of FIG. 4 each monitor the fill level and flush level of an individual data set and control the progress of the respective data set assigned thereto by outputting an ENABLE=true command to the associated section of the pipeline 12 provided that the positions of the data items of the assigned data set satisfies inequality (4). The LUs 20A, 20B, and 20C also output information pertaining to the various fill levels and flush levels to the logic controller 22 together with information pertaining to the commands sent to the pipeline 12. In turn, the logic controller 22 monitors this information and coordinates the output commands of each LUs 20A, 20B, and 20C so as to ensure that the data sets A, B, C, and D, do not collide with each other as they stream through the pipeline 12. For example, referring to FIG. 4, if LU 20A is stalled such that data set A is prohibited from advancing whilst data set B continues to advance, it may be possible that data set A and data set B collide creating the condition:

$$FILL\_LEVEL_A \leq FLUSH\_LEVEL_B. \quad (5)$$

The logic controller is able to detect the likelihood of such a condition arising and is able to force one or more LUs 20 to output a STALL=true command to their respective sections of the pipeline 12.

In practice, a user of the system generates a computation kernel using a high-level dataflow graph. Data flows from the inputs of this graph to the outputs, with intervening nodes of the graph performing computation on the data. Edges in the graph represent data dependencies between nodes. Once generated, the kernel is then mapped to physical hardware as a synchronous pipeline, i.e. all pipeline stages advance at the same time. Each node in the graph is mapped to one or more stages in the pipeline. Synchronous operation is chosen for reasons of efficiency; i.e. only a small amount of logic is needed to control each pipeline stage.

For correct operation, the nodes in the dataflow graph are scheduled relative to each other such that the output of a given node reaches the input of dependant nodes at the correct time. The nature of this scheduling and the manner in which it is achieved is not critical. However, the skilled person would understand that conceptually, to each node n, a time in the schedule, $t_n$, is assigned (i.e. $0 \leq t_n < \text{pipeline length}$). Multiple nodes may be assigned to the same schedule time.

Figure 5:
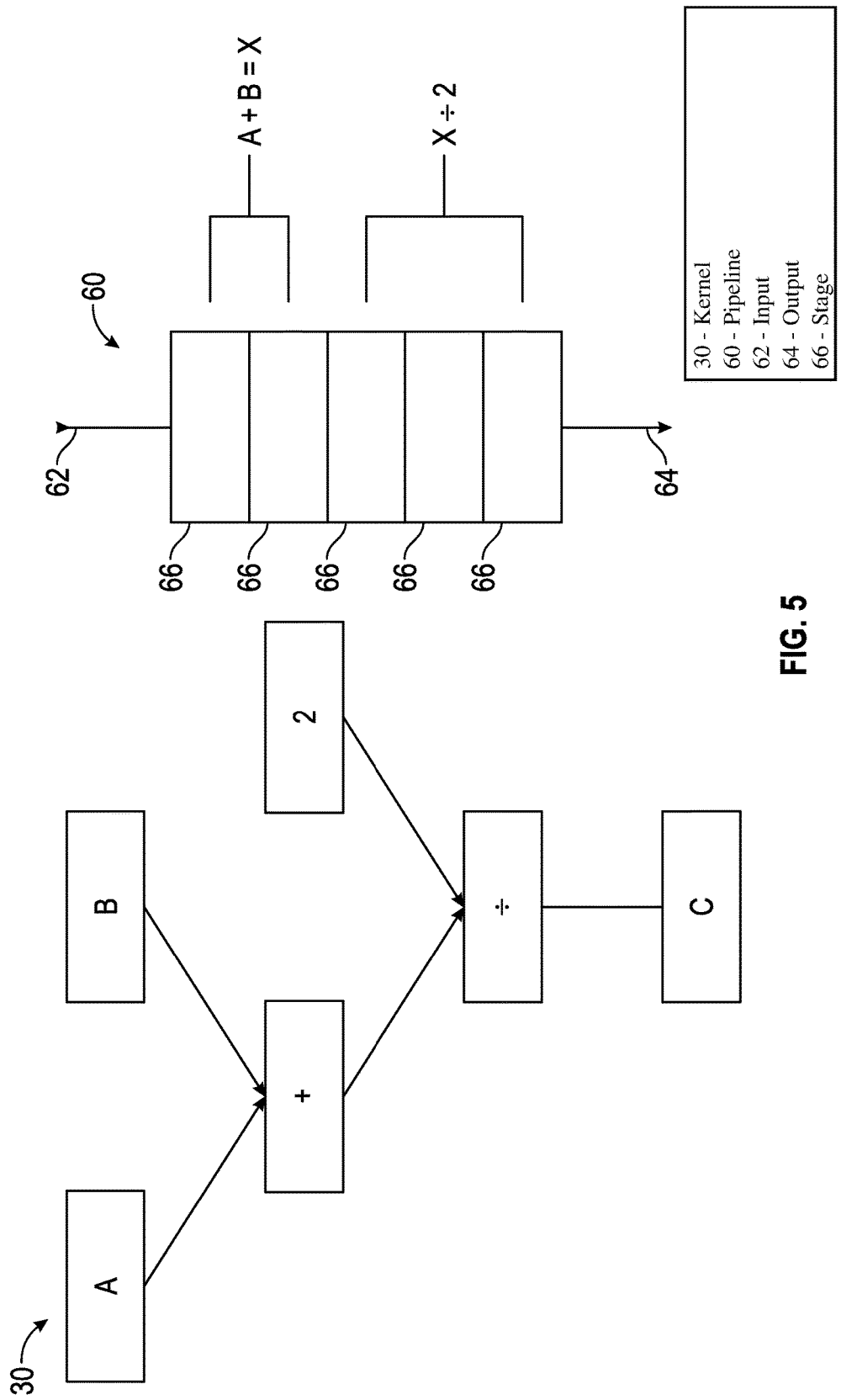
FIG. 5 is a schematic illustration of the mapping of a simple kernel to a simple pipeline.

FIG. 5 shows a simple kernel 30 that computes C=(A+B)/2 and how it is mapped onto a simple pipeline 60. The kernel 30 operates concurrently on several independent sets of data, each of which occupies a contiguous subset of the pipeline 60. The discrete stages 66 of the pipeline 60 corresponding to a given data set are controlled by a single logic unit or state machine (not shown) that determines when the discrete stages may advance and when inputs 62 and outputs 64 should be enabled. The number of concurrent data sets is limited by the number of logic units or state machines available to the pipeline 60. When the final data item of a data set exits the pipeline 60, its logic unit or state machine may be reused to control subsequent data sets entering the pipeline 60. Each logic unit or state machine has a number of inputs and outputs:

- Input: STALL—A Boolean input value indicating that the discrete stages controlled by the logic unit or state machine should not perform an operation. Ideally, the pipeline would process data every clock cycle. However, in certain cases this may not be possible. For example, an external component may not be able to supply input data to the kernel. This signal could be asserted by the logic controller to prevent the logic unit or state machine from advancing a data set through the pipeline.
- Output: ENABLE—A Boolean output value indicating that all discrete stages associated with the section controlled by the logic unit or state machine should advance. For example, if the "STALL" input is true then the "ENABLE" output must be false.
- Output: FILL_LEVEL—An integer output specifying the position of the first data item of the data set in the pipeline (0≤FILL_LEVEL≤pipeline length). The fill level increments each clock cycle when "ENABLE" is true (i.e. it tracks the 'leading edge' of the data set).
- Output: FLUSH_LEVEL—An integer output specifying the position of the last data item of the data set in the pipeline (0≤FLUSH_LEVEL≤FILL_LEVEL). The flush level is initially 0 and is only relevant once the final data item of a data set has entered the pipeline. The flush level increments each clock cycle when "ENABLE" is true (i.e. it tracks the 'trailing edge' of the data set).
- Various control flow signals for each input and output to the kernel which specify when data is generated or consumed by external components.

It follows that a given logic unit or state machine controls all discrete stages 66 scheduled at time t such that:

$$FLUSH\_LEVEL < t \leq FILL\_LEVEL \quad (6)$$

and that no other logic unit or state machine may control the same discrete stages 66.

The stream architecture 10 may be implemented using one or more processors, which may be, for example, a general-purpose microprocessor, digital signal processor, microcontrollers, or other device configured to execute instructions for performing operations disclosed herein. Processor architectures generally include execution units (e.g., fixed point, floating point, integer, etc.), storage (e.g., registers, memory, etc.), instruction decoding, peripherals (e.g., interrupt controllers, timers, direct memory access controllers, etc.), input/output systems (e.g., serial ports, parallel ports, etc.) and various other components and sub-systems. The storage stores software programming (i.e., processor executable instructions) that the one or more processors execute to perform the operations and functions disclosed herein. The storage is a non-transitory computer-readable storage medium. A computer-readable storage medium may include volatile storage such as random access memory, non-volatile storage (e.g., a hard drive, an optical storage device (e.g., CD or DVD), FLASH storage, read-only-memory), or combinations thereof. Processors execute software instructions. Software instructions alone are incapable of performing a function. Therefore, in the present disclosure, any reference to a function or operation performed by software instructions, or to software instructions performing a function is simply a shorthand means for stating that the function is performed by a processor executing the instructions.

Figure 6:
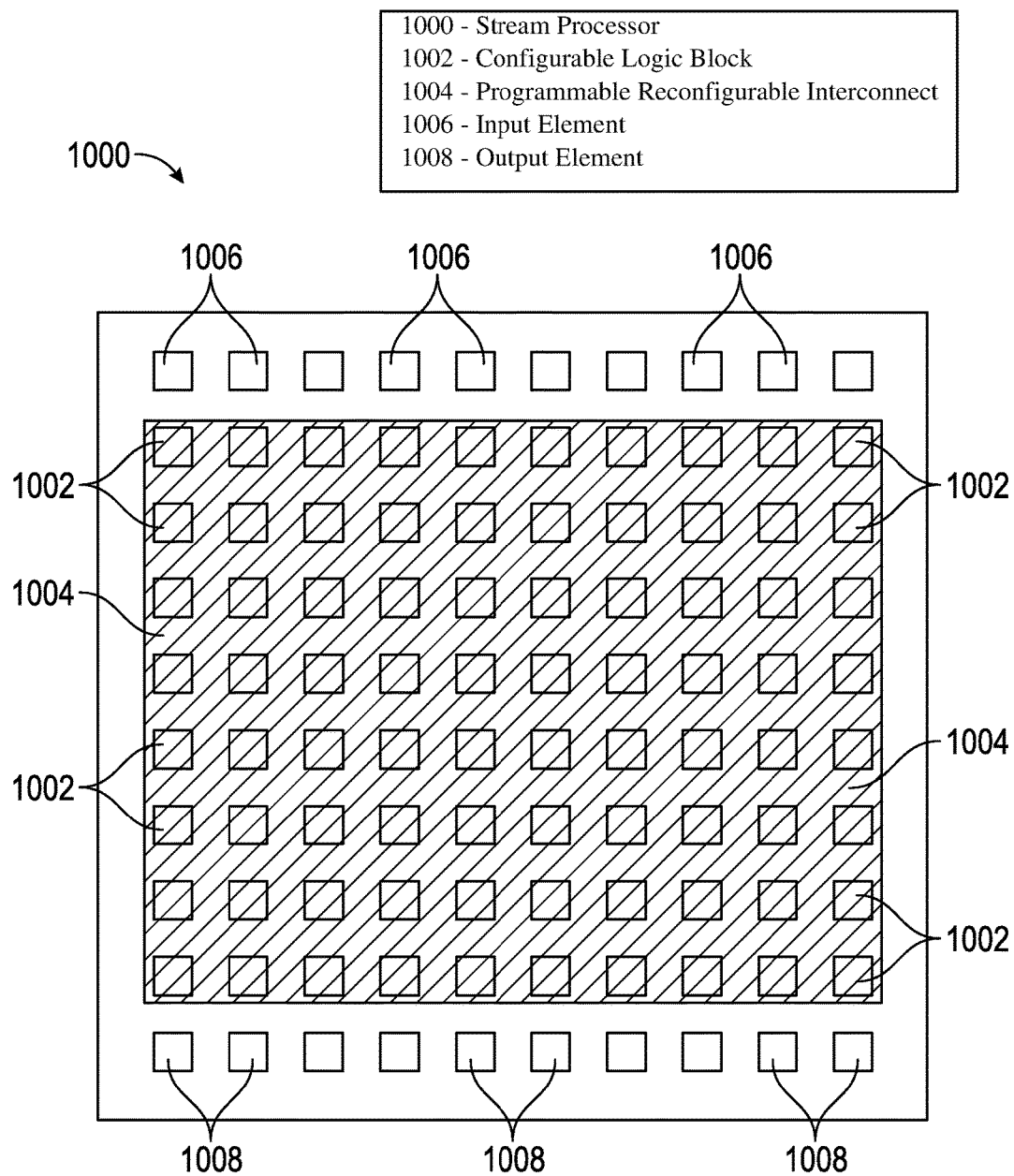
FIG. 6 is a schematic illustration of a field programmable gate array stream processor for implementing a pipelined stream architecture.

As mentioned above, the stream architecture 10 may be implemented by an FPGA stream processor, such as that shown schematically in FIG. 6. It will be appreciated that the stream architecture 10 may also be implemented in any other suitable field programmable hardware accelerator(s) or processor(s). In the embodiments of FIG. 6, the FPGA stream processor 1000 is an IC device which is configurable, for example using computer software programs, after manufacture and comprises hardware elements including a matrix of configurable logic blocks (CLBs) 1002. The CLBs 1002 are interconnected via programmable reconfigurable interconnects (PRIs) 1004 (shown as the shaded area in FIG. 6). In order for the stream processor 1000 to receive and output data, a plurality of input elements 1006 and output elements 1008 are provided.

The pipeline 12 of the stream architecture 10 described in the above embodiments can be mapped onto the input elements 1006, the output elements 1008, and the matrix of CLBs 1002 together with the PRIs 1004.

The stream processor 1000 may also include hardware elements (not shown) corresponding to the LUs 20 of the stream architecture 10 and a hardware element corresponding to the logic controller 22 of the stream architecture 10.

Multiple stream architectures 10 (kernels) can be implemented on the FPGA chip, with interconnected inputs and outputs.

While preferred embodiments have been shown and described, modifications thereof can be made by one skilled in the art without departing from the scope or teachings herein. The embodiments described herein are exemplary only and are not limiting. Many variations and modifications of the systems, apparatus, and processes described herein are possible and are within the scope of the invention. For example, the relative dimensions of various parts, the materials from which the various parts are made, and other parameters can be varied. Accordingly, the scope of protection is not limited to the embodiments described herein, but is only limited by the claims that follow, the scope of which shall include all equivalents of the subject matter of the claims. Unless expressly stated otherwise, the steps in a method claim may be performed in any order. The recitation of identifiers such as (a), (b), (c) or (1), (2), (3) before steps in a method claim are not intended to and do not specify a particular order to the steps, but rather are used to simplify subsequent reference to such steps.

What is claimed is:

1. A method of processing data sets in a pipelined stream processor; the processor having a pipeline for streaming data; the pipeline including at least one input, at least one output, and a plurality of discrete stages; the pipeline being configured to enable a plurality of data sets to be streamed therethrough, wherein each data set comprises a plurality of data items; wherein, in use, data items enter the pipeline from the at least one input, propagate through the pipeline, and exit the pipeline through the at least one output, each discrete stage representing an operation to be performed on a data item occupying said discrete stage; the method comprising:

providing a plurality of logic units separate from the pipeline, wherein each logic unit is configured to be dedicated to monitoring progression of the data items of a respective data set and to controlling progress of the data items of the respective data set through the pipeline such that the data items of a data set do not collide with the data items of another data set.

2. The method according to claim 1, further comprising: providing a logic controller, the logic controller configured to monitor the logic units;

wherein each logic unit is configured to communicate with the logic controller and the logic controller is configured to control the logic units such that the data items of a data set do not collide with the data items of another data set.

3. The method according to claim 2, wherein each data set includes a first item and a last item, a position of the first item along the pipeline defines a fill level and a position of the last item defines a flush level; the method further comprising:

monitoring by the logic units the fill level and the flush level of at least one of the data sets; and communicating by the logic units said fill level and said flush level of the at least one of the data sets to the logic controller.

4. The method according to claim 3, further comprising: monitoring, by the logic units, fill and flush levels of the data sets;

comparing, by the logic controller, the flush level of one of the data sets with the fill level of a subsequent data set; and controlling, by the logic controller, the logic units such that the flush level of said one data set is greater than the fill level of said subsequent data set.

5. The method according to claim 1, further comprising maintaining a predetermined gap of one or more discrete stages of the pipeline between two consecutive data sets.

6. The method according to claim 1, further comprising assigning an unused logic unit to monitor and to control the progress of a data set newly entering the pipeline.

7. The method according to claim 1, further comprising stalling the progress of one of the data sets along the pipeline for a number of clock cycles.

8. The method according to claim 1, wherein the pipeline has more discrete stages than data items within one or more data sets.

9. A pipelined stream processor for processing data sets, the processor comprising:

a pipeline for streaming data, the pipeline having at least one input element circuitry, at least one output element circuitry, and a plurality of discrete stage element circuitries; the pipeline being configured to enable a plurality of data sets to be streamed therethrough, wherein each data set comprises a plurality of data items; wherein the at least one input element circuitry is arranged to enable data items to be received, the discrete stage element circuitries are arranged to enable data items to propagate through the pipeline, the at least one output element circuitry is arranged to enable said data items to exit said pipeline, and each discrete stage element circuitry is arranged to perform an operation on a data item occupying said discrete stage element circuitry; and a plurality of logic unit element circuitries separate from the pipeline, wherein each logic unit element circuitry is arranged to be dedicated to monitoring progression of the data items of a respective data set and to outputting commands to the pipeline to control progress of the data items of the respective data set through the pipeline such that the data items of a data set do not collide with the data items of another data set.

10. The pipelined stream processor according to claim 9, the processor further comprising:

a logic controller element circuitry arranged to monitor the logic unit element circuitries;

wherein each logic unit element circuitry is further arranged to output information to the logic controller element circuitry and the logic controller element circuitry is arranged to control behaviour and output commands of the logic unit element circuitries such that the data items of a data set do not collide with the data items of another data set.

11. The pipelined stream processor according to claim 10, wherein each data set includes a first item and a last item, a position of the first item along the pipeline defines a fill level and a position of the last item defines a flush level; each logic unit element circuitry is further arranged to monitor the fill level and the flush level of one of the data sets, and to output information pertaining to said fill level and said flush level to the logic controller element circuitry.

12. The pipelined stream processor according to claim 11, wherein the logic unit element circuitries are further arranged to monitor fill levels and flush levels of the plurality of data sets; and wherein the logic controller element circuitry is further arranged to compare the flush level of one data set with the fill level of a subsequent data set, and to control the logic unit element circuitries such that the flush level of said one data set is greater than the fill level of said subsequent data set.

13. The pipelined stream processor according to claim 9, the processor further comprising a logic controller element circuitry arranged to monitor the logic unit element circuitries; wherein the logic controller element circuitry is further arranged to coordinate the logic unit element circuitries to output commands to maintain a gap of one or more discrete stage element circuitries of the pipeline between two consecutive data sets.

14. The pipelined stream processor according to claim 9, wherein the processor is further arranged to enable an unused logic unit element circuitry to be assigned to monitor and to control the progress of a data set newly entering the pipeline.

15. The pipelined stream processor according to claim 9, wherein at least one of the logic unit element circuitries is further arranged to output commands to stall the progress of one of the data sets along said pipeline for a predetermined number of clock cycles.

16. The pipelined stream processor according to claim 9, wherein the pipeline has more discrete stage element circuitries than data items within one or more data sets.

17. A non-transitory computer-readable storage medium comprising instructions that when executed cause one or more processors to:

upon receipt of a plurality of data items of a plurality of data sets through at least one input, propagate the data items through a pipelined data path having a plurality of discrete stages, and output the data items through at least one output; and use a plurality of dedicated logic unit elements separate from the pipelined data path to monitor progression of the data items of the data sets and control progress of the data items of said data sets through the pipelined data path such that data items of a data set do not collide with data items of another data set, wherein each dedicated logic unit element monitors progression of data items of a respective data set and controls progress of the data items of said respective data set, wherein each discrete stage represents an operation to be performed on a data item occupying said discrete stage.

* * * * *